US012706872B2

(12) United States Patent
Lohmar et al.

(10) Patent No.: US 12,706,872 B2
(45) Date of Patent: Aug. 11, 2026

(54) METHODS AND APPARATUSES FOR IMPLEMENTING A SERVICE REQUEST

(71) Applicant: Telefonaktiebolaget LM Ericsson (publ), Stockholm (SE)

(72) Inventors: Thorsten Lohmar, Aachen (DE); Antonio Iniesta Gonzalez, Madrid (ES); Hans Mattsson, Mölndal (SE); Miguel Angel Muñoz De La Torre Alonso, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 396 days.

(21) Appl. No.: 18/034,630

(22) PCT Filed: Nov. 30, 2020

(86) PCT No.: PCT/EP2020/083886
§ 371 (c)(1),
(2) Date: Apr. 28, 2023

(87) PCT Pub. No.: WO2022/083884
PCT Pub. Date: Apr. 28, 2022

(65) Prior Publication Data

US 2023/0412558 A1 Dec. 21, 2023

(30) Foreign Application Priority Data

Oct. 23, 2020 (EP) .................................... 20382925

(51) Int. Cl.
*H04L 61/2514* (2022.01)
*H04L 61/2503* (2022.01)
*H04L 61/4511* (2022.01)
*H04L 101/618* (2022.01)

(52) U.S. Cl.
CPC ...... *H04L 61/2514* (2013.01); *H04L 61/2591* (2025.05); *H04L 61/4511* (2022.05); *H04L 2101/618* (2022.05)

(58) Field of Classification Search
CPC ...................... H04L 61/2591; H04L 2101/618
See application file for complete search history.

(56) References Cited

U.S. PATENT DOCUMENTS 11,736,936 B2 * 8/2023 Colom Ikuno ......... H04W 8/18 455/435.1
11,968,167 B2 * 4/2024 Thiebaut .............. H04L 61/255
(Continued)

FOREIGN PATENT DOCUMENTS

CN 109921918 A 6/2019
CN 110048951 A 7/2019
(Continued)

OTHER PUBLICATIONS

Chris Boulton, et al. NAT Traversal Practices for Client-Server SIP. No. 6314, RFC Editor, Jul. 2011, https://doi.org/10.17487/RFC6314. Request for Comments. (Year: 2011).*
(Continued)

*Primary Examiner* — Alex Tran
(74) *Attorney, Agent, or Firm* — COATS & BENNETT, PLLC

(57) ABSTRACT

Embodiments described herein relate to methods and apparatuses for the provision of an address resolver function. An application client is connected to a core network via a wireless device, wherein the application client is unaware of a session binding internet protocol, IP, address associated with a PDU session established between the wireless device and an anchor point to a data network. A method in the application client comprises transmitting an address request to an address resolver function, wherein the address resolver function is connected between the wireless device and a
(Continued)

Network Address Translation, NAT, function; receiving an indication of the session binding IP address from the address resolver function; and transmitting an augmented service request to an application function, wherein the augmented service request comprises the session binding IP address.

10 Claims, 10 Drawing Sheets

(56) References Cited

U.S. PATENT DOCUMENTS

| | | | | |
|---|---|---|---|---|
| 12,231,439 | B2 * | 2/2025 | Ren | H04L 63/126 |
| 2022/0191650 | A1 * | 6/2022 | Kim | H04L 67/53 |

FOREIGN PATENT DOCUMENTS

| | | | | |
|---|---|---|---|---|
| WO | WO-2019141120 A1 * | 7/2019 | | H04L 67/148 |
| WO | WO-2020020295 A1 * | 1/2020 | | H04W 76/11 |

OTHER PUBLICATIONS

3rd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.6.0, Sep. 2020, pp. 1-447, 3GPP.

3rd Generation Partnership Project, "3rd Generation Partnership Project; Technical Specification Group Core Network and Terminals; 5G System; Binding Support Management Service; Stage 3 (Release 16)", Technical Specification, 3GPP TS 29.521 V16.5.0, Sep. 2020, pp. 1-34, 3GPP.

3rd Generation Partnership Project, "3rd Generation Partnership Project; Technical Specification Group Services and System Aspects; Study on the Wireless and Wireline Convergence for the 5G system architecture (Release 16)", Technical Report, 3GPP TR 23.716 V16.0.0, Dec. 2018, pp. 1-184, 3GPP.

Brd Generation Partnership Project, "3rd Generation Partnership Project; Technical Specification Group Services and System Aspects; System architecture for the 5G System (5GS); Stage 2 (Release 16)", Technical Specification, 3GPP TS 23.501 V16.4.0, Mar. 2020, pp. 1-430, 3GPP.

Boulton, C. et al., "NAT Traversal Practices for Client-Server SIP", Internet Engineering Task Force (IETF), Jul. 2011, pp. 1-60, RFC 6314, IETF.

Petit-Huguenin, M. et al., "Session Traversal Utilities for NAT (STUN)", Internet Engineering Task Force (IETF), Feb. 2020, pp. 1-67, RFC 8489, IETF.

* cited by examiner

Figure 5:
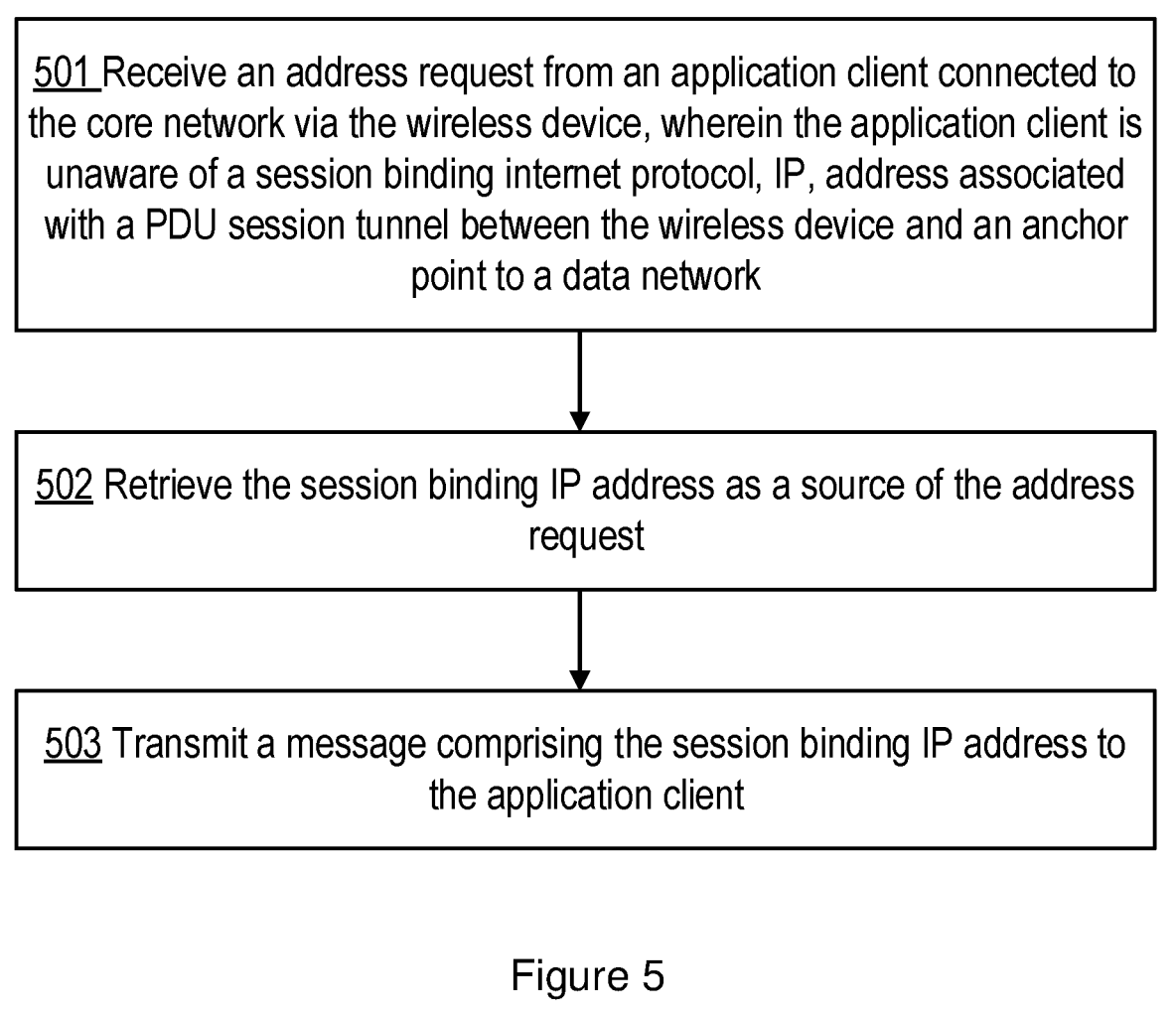

501 Receive an address request from an application client connected to the core network via the wireless device, wherein the application client is unaware of a session binding internet protocol, IP, address associated with a PDU session tunnel between the wireless device and an anchor point to a data network 502 Retrieve the session binding IP address as a source of the address request 503 Transmit a message comprising the session binding IP address to the application client

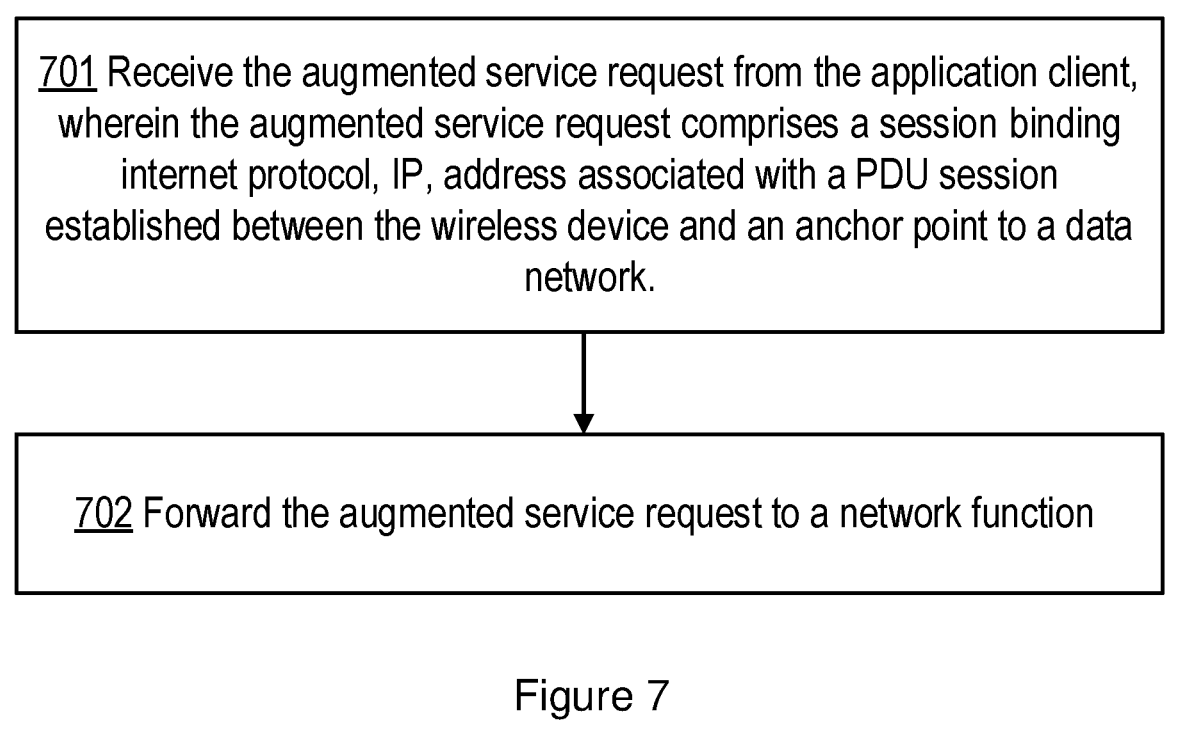

701 Receive the augmented service request from the application client, wherein the augmented service request comprises a session binding internet protocol, IP, address associated with a PDU session established between the wireless device and an anchor point to a data network.

702 Forward the augmented service request to a network function

Figure 7

METHODS AND APPARATUSES FOR IMPLEMENTING A SERVICE REQUEST

TECHNICAL FIELD

Embodiments described herein relate to methods and apparatuses for implementing a service request in scenarios in which a network address translator is hiding a session binding Internet Protocol (IP) address from an application function.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Many Mobile Network Operators (MNOs) separate the mobile network using Network Address Translators (NAT, RFC 2663) from the Public Internet. The high-performance NATs deployed by MNOs are often also called Carrier Grade NATs (CG-NAT) due to high scalability and performance.

The use of a CG-NAT may effectively expand the range of IPv4 addresses available to the MNO. The MNO may assign an internal and private IPv4 address to each UE in the mobile network. However, publically, the MNO only needs to allocate a few (public) IPv4 addresses.

The use of a CG-NAT in a MNO increases privacy, since wireless devices (e.g UEs) and users cannot be tracked by external entities based on their IP address. When using a NAT, many wireless devices use the same public IP address and the external provider cannot easily differentiate between the wireless devices.

In some examples, browsers may restrict the access to network level information such as an IP address, thus, a Browser based UE application may not know be aware of its own IP address.

There may also be UE side NATs. For example UE side NATs may be deployed in Home Networks, where the Residential Gateway implements a NAT to separate the home internal network from the wider area network. A key motivation for a UE side NAT is to connect more devices to the single wide area connection. Operators often only provide a single IP address to the connectivity subscriber. Another common use-case is WiFi tethering, a consumer can turn a smartphone into a WiFi hotspot and connect additional devices to the main wide area connection. Again, the primary value of using a UE side NAT is to connect additional devices to a single MNO subscription (without duplicating the SIM card). There are nowadays also dedicated WiFi hotspot devices, which only support tethering capabilities. Furthermore, an emerging scenario for UE side NATs is in the automotive and railroads industry. For example, a vehicle may contain a gateway function (Mobile Gateway), which contains a UE side NAT.

However, external exposure function, for example a network Exposure Function (NEF), may have publically assigned IP addresses as, for example, an Application Function (AF) in the external Data Network (DN) may need to access the NEF. For example, the NEF may expose an API using HTTPS. An external API invoker may therefore register in order to access the NEF. These NEF may therefore not be hidden behind a CG-NAT. The NEF may have registration, authorization and security procedures as known from other web services, for example, like Web Shopping (Amazon) or streaming portal access. Thus, a NEF is not hidden behind a CG-NAT.

3GPP supports a concept called "Framed Routing" (sometimes also called "Station behind the UE"). Framed Routing allows for support of an IP network behind a UE, such that a range of IP addresses or IPv6 prefixes is reachable over a single PDU session, e.g. for enterprise connectivity. In some industry cases, the devices behind the UE may need to have external addressable IP addresses (mostly due to legacy implementations). The Frame Routing solution allows for an entire network to be assigned to a single PDU Session, so that the UPF can forward all host addresses from this network in addition to the primary UE address. It will be appreciated that the primary UE address may be one of the IP addresses in the IP range of the Framed Routing network, or may be independently assigned. 3GPP does not define any signaling between a UE and the UPF around the assigned Framed Network. Manual configuration is expected, resulting in devices behind the UE using IP addresses from the Framed Network.

To be able to, for example, apply and enforce a policy for a specific application data flow the mobile network (e.g. the NEF and other core network functions) may need to be able to perform session binding, in other words, may need to identify the PDU session and the corresponding control plane and user-plane entities that are handling the PDU session. For this the network exposure function, NEF, (or Service Capability Exposure Function (SCEF) For EPC) may need to know the IP address of the data flow from the wireless device side as it is visible at the PDU session's anchor point to the IP domain. The anchor to the IP domain may be for example the N6 interface for 5GC (e.g. at the user plane function (UPF)), or the Sgi interface for EPC (e.g. at the Packet Gateway (P-GW)). For the purpose of this document this IP address is called the "session binding IP-address".

It will therefore be appreciated that when an application function (AF), via the NEF (or the Binding Support Function (BSF)/Policy Control Function (PCF)), requests, for example, a policy to be applied for an application data flow the AF may need to include the applicable session binding IP-address associated with the PDU session. However if there is a NAT between the anchor point and the AF, the AF may not be able to detect the session binding IP address. Instead the AF may only be able to detect the IP address publically displayed by the NAT.

In examples in which the application client either is collocated with the UE or residing behind a UE side NAT the session binding IP address for the application client will be the same as the IP address that was assigned to the wireless device for the PDU session. However, in scenarios where the UE acts as a router to an adjacent network the session binding IP address will instead be the IP address on which the application client executes in the network. For the latter case the 3GPP network have defined a specific functionality based on framed routes that enables use of the same UE session binding procedure as discussed above.

FIG. 1 illustrates a reference architecture for a Smartphone scenario. In this example, tethered UE application clients 101*a* and 101*b* are tethered to a wireless device 102 (which is, in this example, a smartphone). The wireless device 102 may then connects the tethered application clients 101*a* and 101*b* to the external data network using a single PDU session over the MNO Local Area Network (LAN). The application clients 101*a* and 101*b* are aware, at most, of the IP addresses IF1 and IF1' respectively. In this example, the wireless device 102 comprises a UE side NAT 103, so that an IP address IF2 can be used to provide the single PDU session between the wireless device 102 and the network. It will also be appreciated that a browser application on the wireless device 102 may be unaware of the IP address IF2.

For NEF interactions from an application function 105 requesting, for example, a specific policy for an application flow, the corresponding session binding IP address for the application flow, e.g. IF4, needs to be provided by the application function 105 to the NEF in order for the NEF to be able to orchestrate application of the policy to the application flow. In the example illustrated in FIG. 1, the session binding IP address (IF4) is the same as the IP address assigned to the UE for the PDU session (IF2). However, the application function 105 is only aware of the public IP address of the CG-NAT 104 (IF3). Thus, the application function 105 cannot determine the session binging IP address from any data originating from the application client 101*a* or 101*b* (or the web browser on the wireless device 102).

In this example, the application clients 101*a* and 101*b* are only aware of the internal IP addresses IF1 and IF1' respectively. The application clients therefore have no local possibility to retrieve the session binding IP address IF4.

Although, in this example, the session binding IP address IF4 may be the same as the IP address IF2, and therefore some applications running on the wireless device 102 may have access to the IP address IF2, if an application client running on the wireless device 102 limits access to the local IP address, for example a browser, then such an application client would also not have access to the session binding IP address IF4.

FIG. 2 illustrates a reference architecture for an automotive scenario. Similarly to as described with reference to FIG. 1, the application clients 101*a* and 101*b* may have local IP address IF1 and IF1' respectively. The vehicle may have an IP address IF2 which may be used to provide the PDU session, and the application clients 101 and 101*b* may connect to the external data network via the PDU session. However, the application function 105 is only aware of the public address IF3 provided by the CG-NAT 104 and is therefore not able to provide the NEF with the session binding IP address IF4. Similarly the application clients are only aware of the IP addresses IF1 and IF1' respectively and so are also unable to supply the session binding IP address IF4.

FIG. 3 illustrates the end to end protocol stack with NATs in the path for the example architectures illustrated in FIGS. 1 and 2.

In examples in which framed routing is used, the local addresses IF1 and IF1' may be used as the session binding IP address. However, even in these scenarios there may be applications that limit the access to the local IP address, and in these scenarios even the local addresses IF1 and IF1' may not be available to the application client.

It may therefore be necessary to determine a manner in which the session binding IP address may be made available for use by an application function.

SUMMARY

According to some embodiments there is provided a method in an application client connected to a core network via a wireless device, wherein the application client is unaware of a session binding internet protocol, IP, address associated with a PDU session established between the wireless device and an anchor point to a data network. The method comprises transmitting an address request to an address resolver function, wherein the address resolver function is connected between the wireless device and a Network Address Translation, NAT, function; receiving an indication of the session binding IP address from the address resolver function; and transmitting an augmented service request to an application function, wherein the augmented service request comprises the session binding IP address.

According to some embodiments there is provided a method in an application function for implementing an augmented service request from an application client connected to a core network via a wireless device. The method comprises receiving the augmented service request from the application client, wherein the augmented service request comprises an session binding internet protocol, IP, address associated with a PDU session established between the wireless device and an anchor point to a data network; and forwarding, to a network function, the augmented service request.

According to some embodiments there is provided a method in an address resolver function, wherein the address resolver function is connected between a wireless device and a Network Address Translation, NAT, function. The method comprises receiving an address request from an application client connected to the core network via the wireless device, wherein the application client is unaware of a session binding internet protocol, IP, address associated with a PDU session tunnel between the wireless device and an anchor point to a data network; retrieving the session binding IP address as a source of the address request; and transmitting a message comprising the session binding IP address to the application client.

According to some embodiments there is provided an application client connected to a core network via a wireless device, wherein the application client is unaware of a session binding internet protocol, IP, address associated with a PDU session established between the wireless device and an anchor point to a data network. The application client comprises processing circuitry configured to transmit an address request to an address resolver function, wherein the address resolver function is connected between the wireless device and a Network Address Translation, NAT, function; receive an indication of the session binding IP address from the address resolver function; and transmit an augmented service request to an application function, wherein the augmented service request comprises the session binding IP address.

According to some embodiments there is provided an application function for implementing an augmented service request from an application client connected to a core network via a wireless device. The application function comprises processing circuitry configured to: receive the augmented service request from the application client, wherein the augmented service request comprises an session binding internet protocol, IP, address associated with a PDU session established between the wireless device and an anchor point to a data network; and forward, to a network function, the augmented service request.

According to some embodiments there is provided an address resolver function, wherein the address resolver function is connected between a wireless device and a Network Address Translation, NAT, function. The address resolver function comprises processing circuitry configured to: receive an address request from an application client connected to the core network via the wireless device, wherein the application client is unaware of a session binding internet protocol, IP, address associated with a PDU session tunnel between the wireless device and an anchor point to a data network; retrieve the session binding IP address as a source of the address request; and transmit a message comprising the session binding IP address to the application client.

BRIEF DESCRIPTION OF THE DRAWINGS

For a better understanding of the embodiments of the present disclosure, and to show how it may be put into effect, reference will now be made, by way of example only, to the accompanying drawings, in which:

FIG. 5 illustrates a method in an address resolver function according to some embodiments;

FIG. 6 illustrates a method in an application client connected to a core network via a wireless device according to some embodiments;

FIG. 7 illustrates a method in an application function according to some embodiments;

DESCRIPTION

Figure 1:
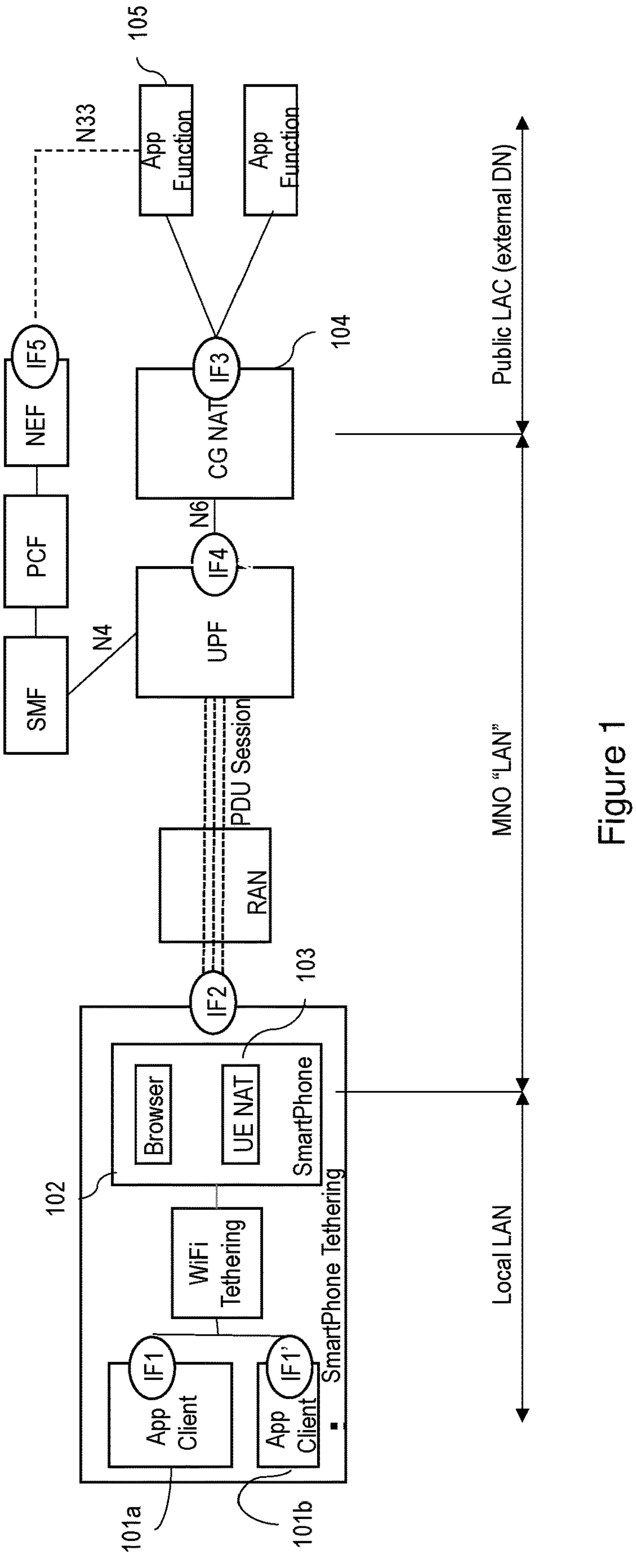
FIG. 1 illustrates a reference architecture for a Smartphone scenario.
Figure 2:
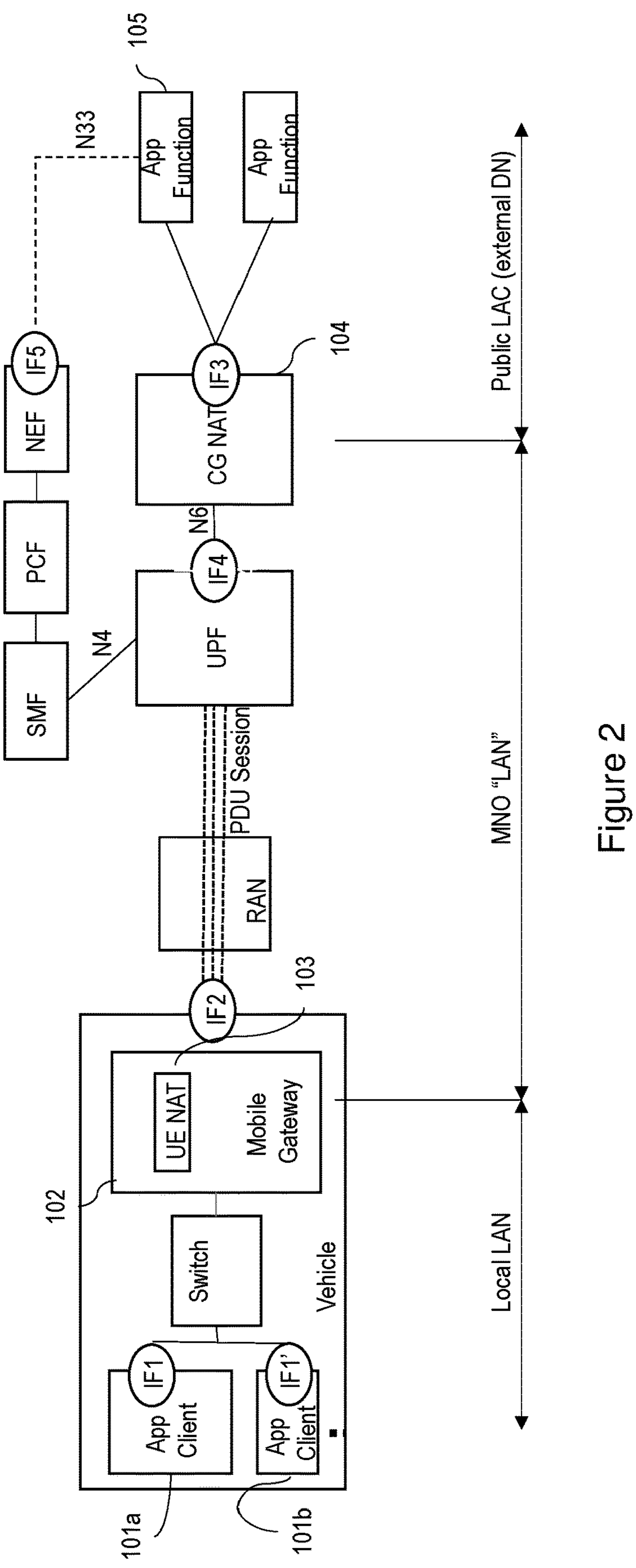
FIG. 2 illustrates a reference architecture for an automotive scenario.
Figure 3:
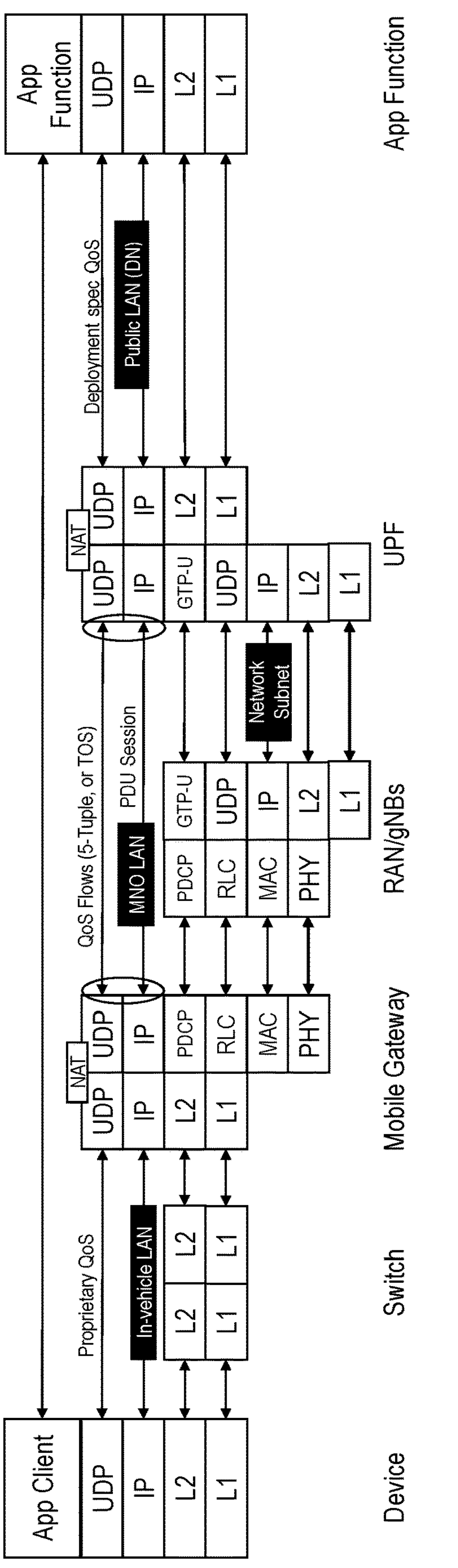
FIG. 3 illustrates an end to end protocol stack with Network Address Translator Functions.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments described herein relate to methods and apparatuses for providing the session binding IP address to an external application function for use in, for example, using APIs exposed by the a network function (e.g. SCEF or NEF) to request specific policies to be applied for data flows related to an application client. For example, the application client may be unaware of the session binding IP address associated with a PDU session established between a wireless device and an anchor point to the external data network comprising the application function. The application client may be located on the wireless device (for example a browser application), or may be tethered or in some manner connected to the core network via wireless device.

In particular, embodiments described herein provide an application server which herein is referred to as an address resolver function. The address resolver function may be connected between the wireless device and a Network Address Translation (NAT) function in the network. The address resolver function may for example be positioned such that it is able to detect and return the session binding IP address.

The session binding IP address may be the address required for the core network to find the PDU session, and the anchor point of the PDU session (UPF for 5G or Packet Gateway (P-GW) for EPC), that is handling traffic related to the application client in the user-plane. The session binding IP address may also be seen as the originating IP address used by the application client as it is visible at the anchor point of the PDU session (e.g. the UPF/P-GW). In other words, the session binding IP address may be the origin IP address of data received from the application client as visible at the N6 interface (or Sgi interface) reference point.

The address resolver function may be therefore be positioned wherever the session binding IP address is detectable. For example, the address resolver function may be included in the UPF (or the Packet Gateway (P-GW) for EPC). The address resolver function may be positioned within the packet Data Network (PDN) between the N6 reference point and any NAT device applicable for the traffic from the application client. The address resolver function may also be positioned somewhere along the PDU session tunnel from (and including parts of) the wireless device to the anchor point (e.g. the UPF/P-GW).

Embodiments described herein are generally described with reference to a 5G architecture. It will however be appreciated that any suitable architecture and equivalent network functions may be used. For example, for an Evolved Packet Core (EPC) architecture. the steps described herein as being performed by the Policy Control Function (PCF) may equivalently be performed by a Policy and Charging Rules Function (PCRF), the steps performed by the Session Management Function (SMF) may be performed by a Packet Gateway (PGW), the steps performed by the User Plane Function (UPF) may be performed by a PGW, the steps performed by the Network Exposure Function (NEF) may be performed by a Service Capability Exposure Function (SCEF), and the steps performed by a Binding Support Function (BSF) may be performed by a Diameter Routing Agent (DRA).

Figure 4:
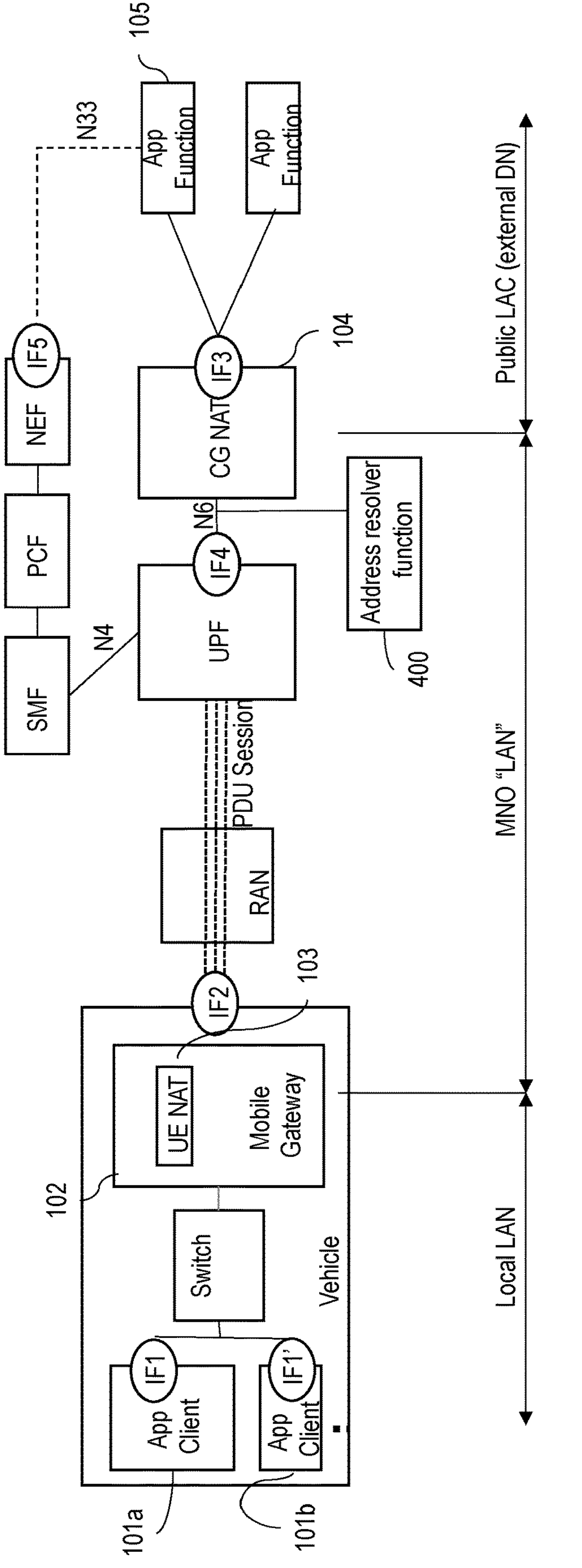
FIG. 4 illustrates an example positioning of the address resolver function in a 5G network architecture according to some embodiments.

FIG. 4 illustrates an example positioning of the address resolver function in a 5G network architecture. In this example, application clients 101*a* and 101*b* are tethered to a wireless device 102. In this example the wireless device comprises a vehicle. In this example, the wireless device comprises a UE side NAT 103. It will be appreciated that in some examples, there may not be a UE side NAT 103. The address resolver function 400 is positioned on the N6 interface between the UPF and the CG NAT 104. The address revolver function is therefore able to detect the session binding IP address IF4 from the anchor point of the PDU session (e.g. the UPF).

The application function 105 may comprise a server communicating with the mobile network using server to server interaction. The application function should not need to store any predefined correlations between an application level user-account and the mobile subscription in use. The application function should then be able to, based on the information retrieved from the PDU session in a way that is trustworthy both for the application function service provider and the mobile network service provider, request services exposed by the mobile network (e.g. by the NEF) requiring one or more of the following identities:

a Session identity (for example the session binding IP address), for example, to enable activation of specific policies for the PDU session or to request monitoring of events related to the PDU session;

a Subscription identity (e.g. Subscription Permanent Identifier (SUPI), International Mobile Subscriber Identity (IMSI), Mobile Station International Subscriber Directory Number (MSISDN) or an External-identifier) to, for example, enable retrieval of policies or charging-status applicable for the subscription used to activate the PDU session or to request monitoring of mobility related events for the corresponding mobile device;

The address resolver function may therefore be provisioned such that, when invoked by an application client, it can return the session binding IP address to the application client.

In some examples the address resolver function may also be provisioned such that, when invoked by an application client and based on the session binding IP address, it can retrieve information from core network functions based on the identity of the subscription (GPSI/IMSI) used to establish the PDU session and return it to the application client.

In examples in which the CG-NAT is deployed within the UPF (i.e. as a NAT Service Function), the address resolver function 400 may also be deployed as a Service Function.

FIG. 5 illustrates a method in an address resolver function, wherein the address resolver function is connected between a wireless device and a Network Address Translation, NAT, function.

In step 501, the address resolver function receives an address request from an application client connected to the core network via the wireless device, wherein the application client is unaware of a session binding internet protocol, IP, address associated with a PDU session tunnel between the wireless device and an anchor point to a data network.

In step 502, the address resolver function retrieves the session binding IP address as a source of the address request. For example, the address resolver function may take the IP address from incoming IP packets from the application client as the session binding IP address.

In step 503, the address resolver function transmits a message comprising the session binding IP address to the application client. For example, the session binding IP address may be provided to the application client as the body of an HTTP response message. The address resolver function may also in some examples lookup the SUPI or GPSI of the application, and may provide it together with the session binding IP address. For example, the address resolver function may request the SUPI or GPSI from the BSF using the session binding IP address.

Figure 6:
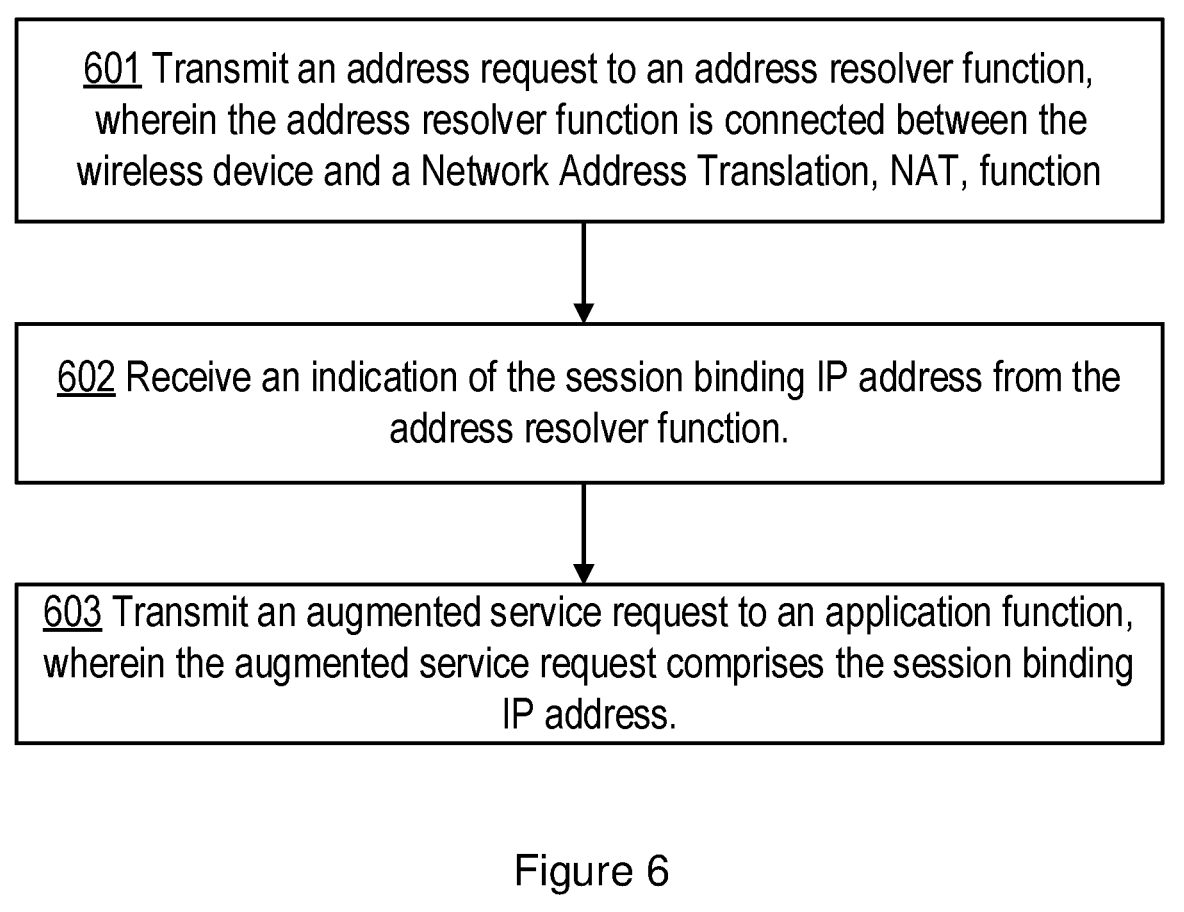

FIG. 6 illustrates a method in an application client connected to a core network via a wireless device, wherein the application client is unaware of a session binding internet protocol, IP, address associated with a PDU session established between the wireless device and an anchor point to a data network. As described above, the application client may be collocated with the wireless device (for example as a browser application) or may be tethered to the wireless device.

In step 601 the application client transmits an address request to an address resolver function, wherein the address resolver function is connected between the wireless device and a Network Address Translation, NAT, function. The address resolver function may perform the method as described above with reference to FIG. 5.

In step 602, the application client receives an indication of the session binding IP address from the address resolver function. In some examples, the application client may also receive an indication of the SUPI and/or GSPI from the address resolver function.

In step 603, the application client transmits an augmented service request to an application function, wherein the augmented service request comprises the session binding IP address. In some examples, the augmented service request may also comprise the SUPI and/or GPSI. The session binding IP address is used to enable a binding to the corresponding session (PDU-connection/PDU-session) as the session is authenticated and authorized in the mobile network for the UE/SIM in use. The augmented service request may therefore comprise a request to apply a policy to the PDU session. The augmented service request may also comprise a request to retrieve information available in the mobile network for the PDU session. The SUPI and the GPSI is used to identify subscription related information which can be used in further requests to retrieve subscription related information such as the charging-state, to start monitoring of related UE events etc.

FIG. 7 illustrates a method in an application function for implementing an augmented service request from an application client connected to a core network via a wireless device. The application client may be configured to perform the method as described with reference to FIG. 5.

In step 701 the application function receives the augmented service request from the application client, wherein the augmented service request comprises a session binding internet protocol, IP, address associated with a PDU session established between the wireless device and an anchor point to a data network.

In step 702, the application function forwards the augmented service request to a network function. For example, the application function may forward the augmented service request to a network exposure function, NEF (or a SCEF in EPC) to expose a network function capable of implementing the augmented service request. For example, where the augmented service request comprises a policy request, the NEF may exposure a PCF (or a Policy and Charging Rules Function (PCRF) for EPC). In some examples, the application function is situated inside the trust domain of the mobile network operator's core network. In these examples, the application function may transmit the augmented service request directly to the network function capable of implementing the augmented service request. If the SUPI and/or GSPI are included in the augmented service request, then the application function may also retrieve subscription related information such as the charging-state, to start monitoring of related UE events etc.

Figure 8:
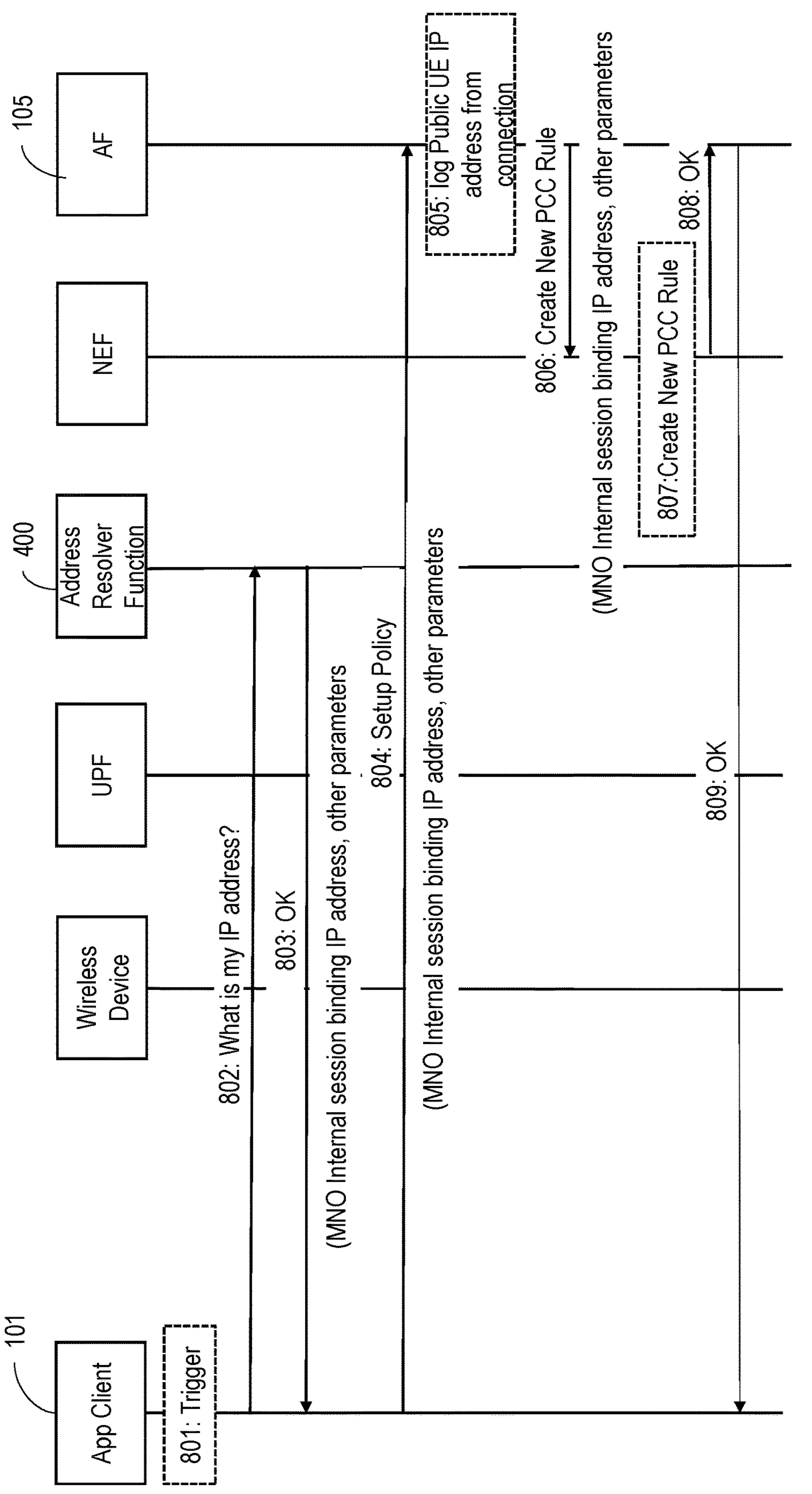
FIG. 8 is a signalling diagram illustrating an example implementation of the methods of FIGS. 5 to 7.
Figure 9:
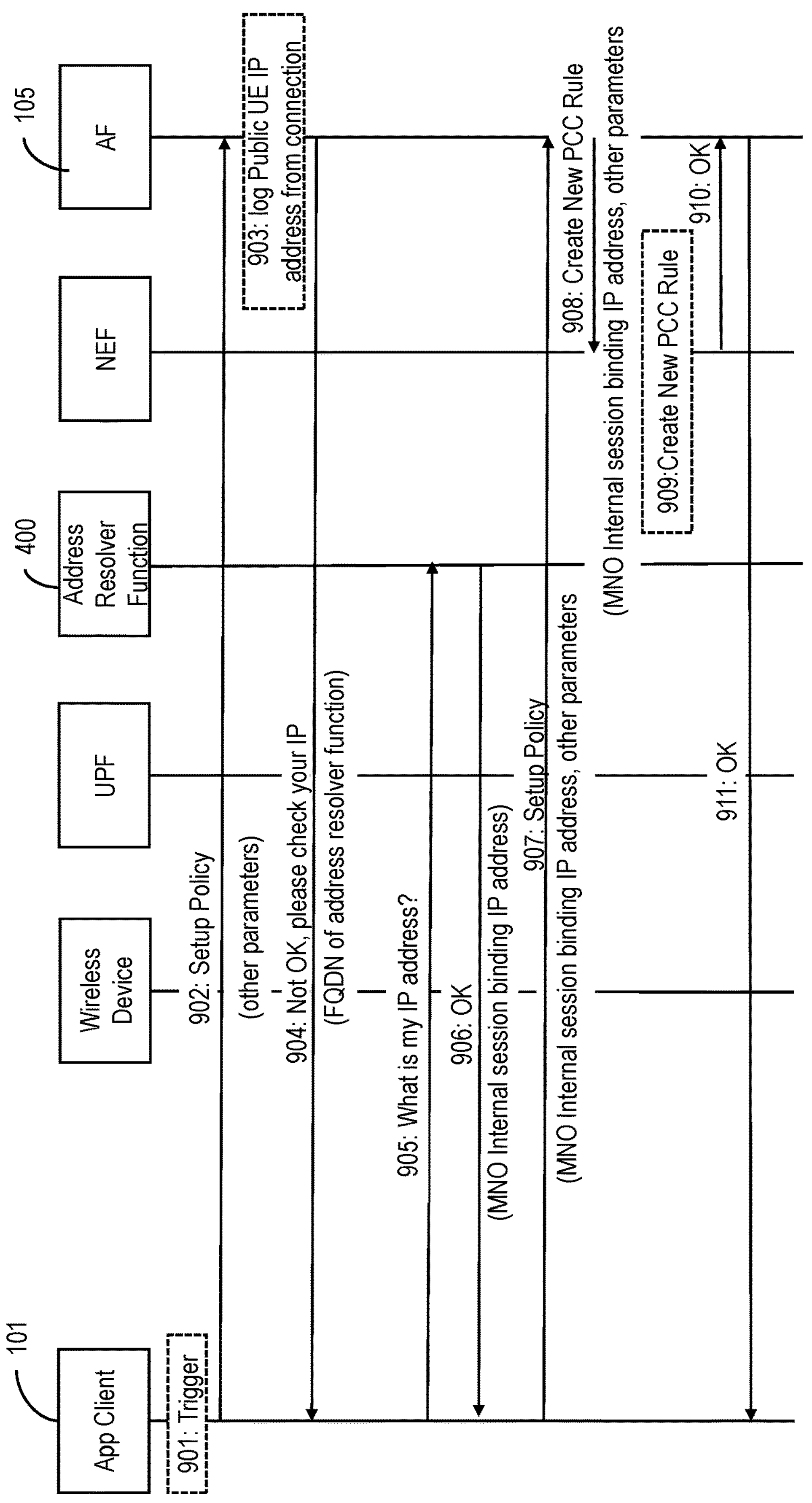
FIG. 9 is a signalling diagram illustrating an example implementation of the methods of FIGS. 5 to 7.

FIGS. 8 and 9 illustrate example implementations of the methods of FIGS. 5 to 7. In these examples a 5G core network architecture is illustrated. It will however be appreciated that the methods described may be applied to other network architectures.

FIG. 8 is a signalling diagram illustrating an example implementation of the methods of FIGS. 5 to 7.

In this example the application client 101 triggers the resolution of the session binding IP address. The application client 101 then provides the session binding IP address as the mobile network operator Internal UE IP address to the external application function 105, which is interacting with the NEF.

In the example of FIG. 8, the augmented service request comprises a request for a policy to be enforced by the MNO (for example, via the NEF). The policy request may be translated into a PCC rule inside the MNO. It will be appreciated that the augmented service request may be utilized for other examples, not only for PCC rule creation.

In step 801, the application client wants to request a policy (e.g. Quality of Service (QoS) handling or Sponsored data) for the application to be enforced by the MNO.

Responsive to the requirement request a policy to be enforced by a policy control function, PCF, in step 802, before sending the policy request to the application function 105, the application client 101 retrieves session binding IP address (IF4). For example, the application client transmits an address request to the address resolver function 400. The address request may be transmitted to an address (e.g. an IP address) of the address revolver function. The address of the address resolver function may be determined based on a domain name of the address resolver function 400. In this example it may be assumed that the application client 101 has preconfigured the Fully Qualified Domain Name (FQDN) or IP address of the address resolver function 400.

In step 803, the address resolver function 400 retrieves the session binding IP address as a source of the address request and transmits a message comprising the session binding IP address to the application client. For example, the address resolver function may take the IP address from incoming IP packets from the application client as the session binding IP address. Additionally, the address resolver function 400 may look-up the SUPI and/or GSPI and provide the SUPI and/or GSPI together with the session binding IP address.

In step 804, the application client 100 triggers a policy request message (e.g. Setup Policy) towards the application function 105. The policy request message may comprise policy parameters (e.g. QoS handling, Sponsored data, etc) for the application and may also comprise the session binding IP address (IF4). Additionally, the application client may also include the SUPI and/or GSPI retrieved in the previous step.

In step 805, the application function 105 may store the mapping between the Public UE IP address (IF3) (from the connection) and the session binding IP address (IF4) received in step 804.

In step 806 the application function 105 triggers towards the NEF a policy request (for example, Create a new PCC rule) including the policy parameters (e.g. QoS handling or Sponsored data) for the application and also including the MNO internal UE session binding IP address (IF4).

In step 807, the NEF finds (for example through a BSF) the PCF instance handling the PDU session which is serving the application client 101 by using the session binding IP address (IF4), and triggers towards the PCF instance a policy request (Create a new PCC rule) comprising the policy parameters (e.g. QoS handling or Sponsored data) for the application and also comprising the session binding IP address (IF4).

It is not illustrated in FIG. 5, but it will be appreciated that the PCF may then generate a PCC rule towards SMF/UPF, so that the requested policy is enforced by the MNO. The method for performing the enforcement of the policy will be known in the art.

In step 808 the NEF acknowledges the request received in step 806.

In step 809, the application function 105 acknowledges the request received in step 804.

FIG. 9 is signalling diagram illustrating an example implementation of the methods of FIGS. 5 to 7.

In this example the application client is re-directed by the application function 105 to the address resolver function 400. This solution may have the benefit that the application client 101 does not need MNO specific information, such as the URL or FQDN of the address resolver function 400. The application function may instead trigger a redirect to the MNO specific address resolver function 400.

The Sequence diagram in FIG. 9 shows an example where the application client 101 requests some policy to be enforced by the MNO (via the NEF, and inside MNO this is translated into a PCC rule). Note the session binding IP address (IF4) is not only needed for PCC rule creation, this is just an example use case.

In step 901, the application client 101 wants to request a policy (e.g. QoS handling, Sponsored data, etc) for the application to be enforced by the MNO.

In step 902, the application client triggers an original service request (in this example, Setup Policy) towards the external AF including the policy parameters (e.g. QoS handling, Sponsored data, etc) for the application.

In step 903, the application function 105 stores the Public UE IP address (from the connection, IF3). The application function then transmits the original service request along with the Public UE IP address (IF3) to the NEF. The NEF is not able to find a PCF instance handling the session corresponding to the above Public UE IP address (IF3), so the NEF returns an error message back to the application function 105.

Responsive to receiving the error in step 903, in step 904, the application function 105 answers the message in 902 above indicating that an error has occurred, and requesting that the application client 101 contact the address resolver function 105. In particular step 902 may comprise transmitting an indication of a domain name (e.g. FQDN) of the address resolver function 105.

Responsive to receiving the domain name in step 904, in step 905 the application client 101 transmits an address request to the address resolver function 400. The address request may be transmitted to an address (e.g. IP address) of the address revolver function. The address of the address resolver function may be determined based on a domain name of the address resolver function 400. For example, the application 101 may resolve the FQDN received in step 904 to determine an IP address of the address resolver function 400.

In step 906, the address resolver function 400 transmits the session binding IP address (IF4) to the application client. Additionally, the address resolver function 400 may look-up the SUPI and/or GSPI and provide the SUPI and/or GSPI together with the session binding IP address.

In step 907, the application client transmits an augmented policy request message (Setup Policy) towards the application function 105. The augmented policy request message may comprise the same policy parameters as the policy request transmitted in step 902, but may also comprise the session binding IP address (IF4). Additionally, the application client 101 may include the SUPIs and/or GSPI retrieved in step 906 in the augmented policy request.

In step 908 the application function 105 triggers towards the NEF a policy request (for example, Create a new PCC rule) including the policy parameters (e.g. QoS handling or Sponsored data) for the application and also including the MNO internal UE session binding IP address (IF4).

In step 909, the NEF finds (for example through a BSF) the PCF instance handling the PDU session which is serving the application client 101 by using the session binding IP address (IF4), and triggers towards the PCF instance a policy request (Create a new PCC rule) comprising the policy parameters (e.g. QoS handling or Sponsored data) for the application and also comprising the session binding IP address (IF4).

It is not illustrated in FIG. 5, but it will be appreciated that the PCF may then generate a PCC rule towards SMF/UPF, so that the requested policy is enforced by the MNO. The method for performing the enforcement of the policy will be known in the art.

In step 910 the NEF acknowledges the request received in step 908.

In step 911, the application function 105 acknowledges the request received in step 906.

Figure 10:
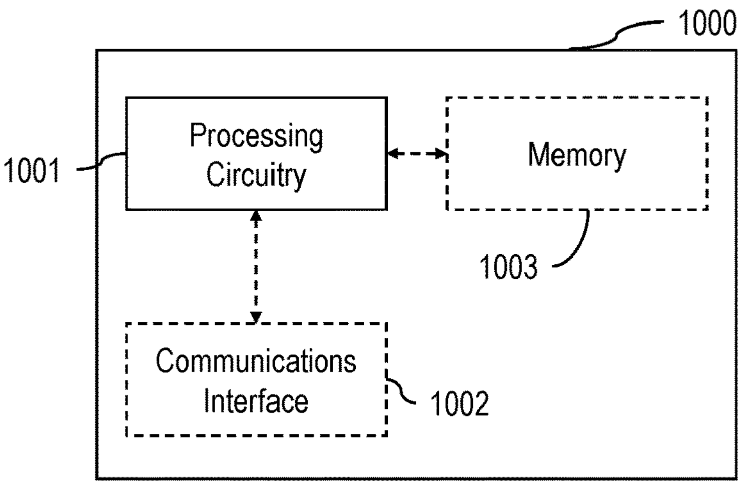
FIG. 10 illustrates an application client comprising processing circuitry (or logic)

FIG. 10 illustrates an application client 1000 comprising processing circuitry (or logic) 1001. The processing circuitry 1001 controls the operation of the application client 1000 and can implement the method described herein in relation to an application client 1000.

The processing circuitry 1001 can comprise one or more processors, processing units, multi-core processors or modules that are configured or programmed to control the application client 1000 in the manner described herein. In particular implementations, the processing circuitry 1001 can comprise a plurality of software and/or hardware modules that are each configured to perform, or are for performing, individual or multiple steps of the method described herein in relation to the application client 1000.

Briefly, the processing circuitry 1001 of the application client 1000 is configured to: transmit an address request to an address resolver function, wherein the address resolver function is connected between the wireless device and a Network Address Translation, NAT, function; receive an indication of the session binding IP address from the address resolver function; and transmit an augmented service request to an application function, wherein the augmented service request comprises the session binding IP address.

In some embodiments, the application client 1000 may optionally comprise a communications interface 1002. The communications interface 1002 of the application client 1000 can be for use in communicating with other nodes, such as other virtual nodes. For example, the communications interface 1002 of the application client 1000 can be configured to transmit to and/or receive from other nodes requests, resources, information, data, signals, or similar. The processing circuitry 1001 of application client 1000 may be configured to control the communications interface 1002 of the application client 1000 to transmit to and/or receive from other nodes requests, resources, information, data, signals, or similar.

Optionally, the application client 1000 may comprise a memory 1003. In some embodiments, the memory 1003 of the application client 1000 can be configured to store program code that can be executed by the processing circuitry 1001 of the application client 1000 to perform the method described herein in relation to the application client 1000. Alternatively or in addition, the memory 1003 of the application client 1000, can be configured to store any requests, resources, information, data, signals, or similar that are described herein. The processing circuitry 1001 of the application client 1000 may be configured to control the memory 1003 of the application client 1000 to store any requests, resources, information, data, signals, or similar that are described herein.

Figure 11:
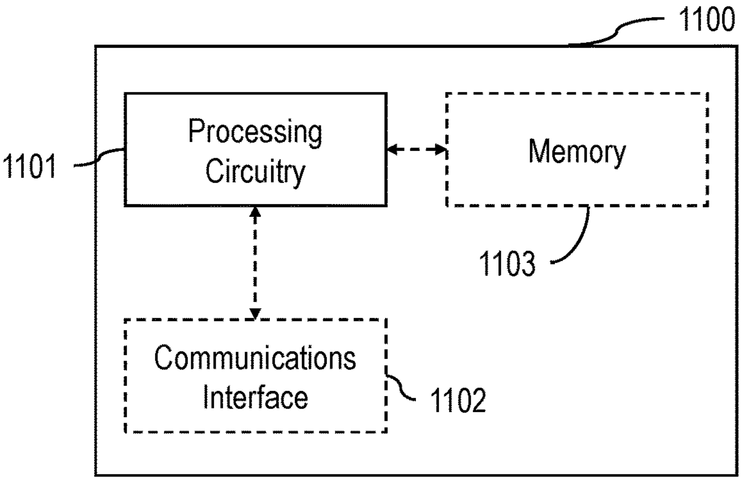
FIG. 11 illustrates an application function comprising processing circuitry (or logic)

FIG. 11 illustrates an application function 1100 comprising processing circuitry (or logic) 1101. The processing circuitry 1101 controls the operation of the application function 1100 and can implement the method described herein in relation to an application function 1100. The processing circuitry 1101 can comprise one or more processors, processing units, multi-core processors or modules that are configured or programmed to control the application function 1100 in the manner described herein. In particular implementations, the processing circuitry 1101 can comprise a plurality of software and/or hardware modules that are each configured to perform, or are for performing, individual or multiple steps of the method described herein in relation to the application function 1100.

Briefly, the processing circuitry 1101 of the application function 1100 is configured to: receive the augmented service request from the application client, wherein the augmented service request comprises an session binding internet protocol, IP, address associated with a PDU session established between the wireless device and an anchor point to a data network; and forward, to a network function, the augmented service request.

In some embodiments, the application function 1100 may optionally comprise a communications interface 1102. The communications interface 1102 of the application function 1100 can be for use in communicating with other nodes, such as other virtual nodes. For example, the communications interface 1102 of the application function 1100 can be configured to transmit to and/or receive from other nodes requests, resources, information, data, signals, or similar. The processing circuitry 1101 of application function 1100 may be configured to control the communications interface 1102 of the application function 1100 to transmit to and/or receive from other nodes requests, resources, information, data, signals, or similar.

Optionally, the application function 1100 may comprise a memory 1103. In some embodiments, the memory 1103 of the application function 1100 can be configured to store program code that can be executed by the processing circuitry 1101 of the application function 1100 to perform the method described herein in relation to the application function 1100. Alternatively or in addition, the memory 1103 of the application function 1100, can be configured to store any requests, resources, information, data, signals, or similar that are described herein. The processing circuitry 1101 of the application function 1100 may be configured to control the memory 1103 of the application function 1100 to store any requests, resources, information, data, signals, or similar that are described herein.

Figure 12:
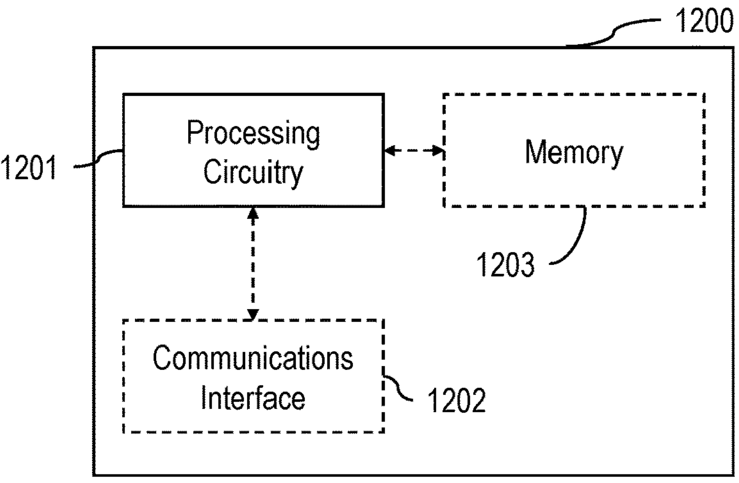
FIG. 12 illustrates an address resolver function comprising processing circuitry (or logic).

FIG. 12 illustrates an address resolver function 1200 comprising processing circuitry (or logic) 1201. The processing circuitry 1201 controls the operation of the address resolver function 1200 and can implement the method described herein in relation to an address resolver function 1200. The processing circuitry 1201 can comprise one or more processors, processing units, multi-core processors or modules that are configured or programmed to control the address resolver function 1200 in the manner described herein. In particular implementations, the processing circuitry 1201 can comprise a plurality of software and/or hardware modules that are each configured to perform, or are for performing, individual or multiple steps of the method described herein in relation to the address resolver function 1200.

Briefly, the processing circuitry 1201 of the address resolver function 1200 is configured to: receive an address request from an application client connected to the core network via the wireless device, wherein the application client is unaware of a session binding internet protocol, IP, address associated with a PDU session tunnel between the wireless device and an anchor point to a data network; retrieve the session binding IP address as a source of the address request; and transmit a message comprising the session binding IP address to the application client.

In some embodiments, the address resolver function 1200 may optionally comprise a communications interface 1202. The communications interface 1202 of the address resolver function 1200 can be for use in communicating with other nodes, such as other virtual nodes. For example, the communications interface 1202 of the address resolver function 1200 can be configured to transmit to and/or receive from other nodes requests, resources, information, data, signals, or similar. The processing circuitry 1201 of address resolver function 1200 may be configured to control the communications interface 1202 of the address resolver function 1200 to transmit to and/or receive from other nodes requests, resources, information, data, signals, or similar.

Optionally, the address resolver function 1200 may comprise a memory 1203. In some embodiments, the memory 1203 of the address resolver function 1200 can be configured to store program code that can be executed by the processing circuitry 1201 of the address resolver function 1200 to perform the method described herein in relation to the address resolver function 1200. Alternatively or in addition, the memory 1203 of the address resolver function 1200, can be configured to store any requests, resources, information, data, signals, or similar that are described herein. The processing circuitry 1201 of the address resolver function 1200 may be configured to control the memory 1203 of the address resolver function 1200 to store any requests, resources, information, data, signals, or similar that are described herein.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in an application client connected to a core network via a wireless device, wherein the application client is unaware of a session binding internet protocol (IP) address associated with a Protocol Data Unit (PDU) session established between the wireless device and an anchor point to a data network, the method comprising:

transmitting an original service request to an application function;

receiving, from the application function and in response to the original service request, a domain name of an address resolver function connected between the wireless device and a Network Address Translation (NAT) function;

determining an address of the address resolver function based on the domain name of the address resolver function received from the application function;

transmitting an address request to the address of the address resolver function;

receiving an indication of the session binding IP address from the address resolver function; and transmitting an augmented service request to the application function, wherein the augmented service request comprises the session binding IP address.

2. The method of claim 1, wherein the augmented service request comprises an augmented policy request, and wherein the method further comprises, transmitting the address request responsive to a requirement to request a policy to be enforced by a Policy Control Function (PCF).

3. The method of claim 1, wherein the anchor point comprises a user plane function (UPF).

4. A method in an application function for implementing an augmented service request from an application client connected to a core network via a wireless device, the method comprising:

receiving an original service request from the application client;

transmitting, to a Network Exposure Function (NEF), the original service request along with a public address associated with a Protocol Data Unit (PDU) session established between the wireless device and an anchor point to a data network;

receiving an error message from the NEF indicating that a network function cannot be found to service the original service request based on the public address;

transmitting, to the application client and in response to receiving the error message from the NEF, an indication of a domain name of an address resolver function connected between the wireless device and a Network Address Translation (NAT) function in the core network;

receiving the augmented service request from the application client, wherein the augmented service request comprises a session binding internet protocol (IP) address associated with the PDU session established between the wireless device and the anchor point to the data network; and forwarding, to a Network Exposure Function (NEF), the augmented service request.

5. The method of claim 4, further comprising:

receiving the augmented service request in response to transmitting the indication of the domain name of the address resolver function to the application client; and wherein the augmented service request comprises an augmented policy request.

6. An application client connected to a core network via a wireless device, wherein the application client is unaware of a session binding internet protocol (IP) address associated with a Protocol Data Unit (PDU) session established between the wireless device and an anchor point to a data network, the application client comprising:

processing circuitry and a memory, the memory containing instructions executable by the processing circuitry such that the processing circuitry is configured to:

transmit an original service request to an application function;

receive, from the application function and in response to the original service request, a domain name of an address resolver function connected between the wireless device and a Network Address Translation (NAT) function;

determine an address of the address resolver function based on the domain name of the address resolver function received from the application function;

transmit an address request to the address of the address resolver function;

receive an indication of the session binding IP address from the address resolver function; and transmit an augmented service request to the application function, wherein the augmented service request comprises the session binding IP address.

7. The application client of claim 6, wherein:

the augmented service request comprises an augmented policy request;

the processing circuitry is further configured to transmit the address request responsive to a requirement to request a policy to be enforced by a Policy Control Function (PCF); and the anchor point comprises a User Plane Function (UPF).

8. An application function for implementing an augmented service request from an application client connected to a core network via a wireless device, the application function comprising:

processing circuitry and a memory, the memory containing instructions executable by the processing circuitry such that the processing circuitry is configured to:

receive an original service request from the application client;

transmit, to a Network Exposure Function (NEF), the original service request along with a public address associated with a Protocol Data Unit (PDU) session established between the wireless device and an anchor point to a data network;

receive an error message from the NEF indicating that a network function cannot be found to service the original service request based on the public address;

transmit, to the application client and in response to receiving the error message from the NEF, an indication of a domain name of an address resolver function connected between the wireless device and a Network Address Translation (NAT) function in the core network;

receive the augmented service request from the application client, wherein the augmented service request comprises a session binding internet protocol, IP, (IP) address associated with the PDU session established between the wireless device and the anchor point to the data network; and forward, to a Network Exposure Function (NEF), the augmented service request.

9. The application function of claim 8, wherein the processing circuitry is further configured to receive the augmented service request in response to transmitting the indication of the domain name of the address resolver function to the application client.

10. The application function of claim 8, wherein the augmented service request comprises an augmented policy request.

* * * * *